(12) United States Patent
Wang

(10) Patent No.: US 12,244,031 B2
(45) Date of Patent: Mar. 4, 2025

(54) BATTERY PACK AND LEGGED ROBOT COMPRISING THE SAME

(71) Applicant: HangZhou YuShu TECHNOLOGY CO., LTD., Hangzhou (CN)

(72) Inventor: Xingxing Wang, Hangzhou (CN)

(73) Assignee: HANGZHOU YUSHU TECHNOLOGY CO., LTD., Zhejiang (CN)

( * ) Notice: Subject to any disclaimer, the term of this patent is extended or adjusted under 35 U.S.C. 154(b) by 627 days.

(21) Appl. No.: 17/435,918

(22) PCT Filed: Feb. 24, 2020

(86) PCT No.: PCT/CN2020/076439
§ 371 (c)(1),
(2) Date: Sep. 2, 2021

(87) PCT Pub. No.: WO2020/186972
PCT Pub. Date: Sep. 24, 2020

(65) Prior Publication Data
US 2022/0255177 A1 Aug. 11, 2022

(30) Foreign Application Priority Data
Mar. 19, 2019 (CN) .......................... 201920350714.3

(51) Int. Cl.
H01M 50/262 (2021.01)
B25J 19/00 (2006.01)
(Continued)

(52) U.S. Cl.
CPC ......... *H01M 50/262* (2021.01); *B25J 19/005* (2013.01); *H01M 10/425* (2013.01);
(Continued)

(58) Field of Classification Search
CPC ............. H01M 50/262; H01M 10/425; H01M 50/184; H01M 50/186; H01M 50/213;
(Continued)

(56) References Cited

U.S. PATENT DOCUMENTS 6,168,881 B1 * 1/2001 Fischer ...................... B25F 5/02
429/97
9,572,552 B1 * 2/2017 Bodor .................. H01M 10/613
(Continued)

FOREIGN PATENT DOCUMENTS

| CN | 204218650 U | 3/2015 |
| CN | 106394856 A | 2/2017 |

(Continued)

*Primary Examiner* — Michael L Dignan
(74) *Attorney, Agent, or Firm* — MUNCY, GEISSLER, OLDS & LOWE, P.C.

(57) ABSTRACT

A battery pack, comprising a battery pack panel (8) and slide fasteners (1), the slide fasteners (1) each comprising an engagement tongue (2). Cavities are respectively provided on two sides of the battery back panel (8), the slide fasteners (1) are able to slide inside the cavities, and elastic elements (12) are provided between the slide fasteners (1) and the battery pack panel (8). When the elastic elements (12) exert an elastic force on the slide fasteners (1) and cause same to abut one side of the cavities, the engagement tongues (2) extend out to an outer side of the battery pack panel (8). When an external force overcomes the elastic force provided by the elastic elements (12), the slide fasteners (1) are caused to abut the other side of the cavities, and the engagement tongues (2) are completely withdrawn into the battery pack panel (8). By means of the arrangement of the structure of the slide fasteners, the battery pack is caused to be reliably fixed in and easily removed from a robot body. The invention further relates to a legged robot.

6 Claims, 5 Drawing Sheets

(51) Int. Cl.
*H01M 10/42* (2006.01)
*H01M 50/184* (2021.01)
*H01M 50/186* (2021.01)
*H01M 50/213* (2021.01)

(52) U.S. Cl.
CPC ....... *H01M 50/184* (2021.01); *H01M 50/186* (2021.01); *H01M 2010/4271* (2013.01); *H01M 50/213* (2021.01); *H01M 2220/20* (2013.01)

(58) Field of Classification Search
CPC ..... H01M 2010/4271; H01M 2220/30; H01M 10/613; H01M 10/625; H01M 10/6562; H01M 50/503; H01M 50/244; H01M 50/249; H01M 50/271; B25J 19/005; B62D 57/032; Y02E 60/10
See application file for complete search history.

(56) References Cited

U.S. PATENT DOCUMENTS

| 2005/0221654 | A1* | 10/2005 | Phillips | H01M 50/267 |
| | | | | 439/347 |
| 2011/0224827 | A1* | 9/2011 | Andoh | B62D 57/032 |
| | | | | 901/1 |
| 2014/0302377 | A1* | 10/2014 | Naito | H01M 50/213 |
| | | | | 429/156 |
| 2015/0214520 | A1* | 7/2015 | Nishikawa | B25F 5/006 |
| | | | | 429/100 |
| 2019/0058171 | A1* | 2/2019 | Rejman | H01M 10/00 |

FOREIGN PATENT DOCUMENTS

| CN | 208433452 U | 1/2019 |
| CN | 209665367 U | 11/2019 |
| DE | 102004027902 A1 | 12/2005 |
| EP | 1032058 A1 | 8/2000 |

* cited by examiner

BATTERY PACK AND LEGGED ROBOT COMPRISING THE SAME

TECHNICAL FIELD

The present application relates to a battery pack, in particular to a battery pack of a legged robot.

BACKGROUND

At present, the walking environment of the legged robot is complex. When facing the rugged walking road, the parts in the robot body will produce large vibration, so they need to be fixed reliably. However, for the battery pack in the robot body, it needs to be frequently disassembled for charging, and there is a need for convenient disassembly. Therefore, for the battery pack in the robot body, it needs to have a structure which is not only reliably fixed, but also easy to be disassembled.

Further, when the battery pack is mounted inside the robot body, the fitting position between the battery pack and the robot body needs to have a waterproof structure to prevent liquid from entering the robot body. However, when the battery pack is disassembled, the waterproof structure should not affect the normal disassembly of the battery pack. Therefore, the battery pack needs a structure which is not only sealed and waterproof, but also convenient to be disassembled.

SUMMARY

In order to overcome the defects of the prior art, a first purpose of the present application is to provide a battery pack which is reliably fixed and convenient to be disassembled.

A second purpose of the present application is to provide a battery pack which is not only sealed and waterproof, but also convenient to be disassembled.

A third purpose of the present application is to provide a legged robot which includes the battery pack.

The first purpose of the present application is realized by adopting the following technical solution:
A battery pack, including a battery pack panel and slide fasteners, wherein the slide fasteners each include an engagement tongue, cavities are respectively provided on two sides of the battery back panel, the slide fasteners are able to slide inside the cavities, and elastic elements are provided between the slide fasteners and the battery pack panel;
when the elastic elements exert an elastic force on the slide fasteners and cause the slide fasteners to abut against one side of the cavities, the engagement tongues extend out to an outer side of the battery pack panel; when an external force overcomes the elastic force provided by the elastic elements and the slide fasteners are caused to get close to the other side of the cavities, the engagement tongues are retracted into the battery pack panel.

In the above solution, through the cooperation of the slide fasteners and the engagement tongue structure, when the battery pack is placed inside the robot body, the engagement tongues extend to the outer side of the battery pack and remain an extended state under the action of the elastic force provided by the elastic elements, and the engagement tongues can be clamped with the inside of the robot body, so as to reliably fix the battery pack inside the robot body; when it is necessary to take out the battery pack for charging or maintenance, a force is exerted to the slide fasteners to overcome the elastic force of the elastic elements, the slide fasteners move, and then the engagement tongues are retracted into the battery pack panel, so that the battery pack can be easily taken out from the inside of the robot body. In this solution, the battery pack is reliably fixed in the robot body and is convenient to be taken out.

Further, the engagement tongues are wedge-shaped, and inclined planes of the wedge-shaped engagement tongues face to a bottom of the battery pack. Since the engagement tongues are designed to be wedge-shaped and inclined planes of the engagement tongues face to the bottom of the battery pack, when the battery pack is placed inside the robot body and the engagement tongues are in contact with the robot body, the robot body can exert a force on the inclined planes of the engagement tongues, so as to enable the engagement tongues to be retracted into the battery pack panel to facilitate the placement of the battery pack; when the battery pack is placed inside the robot body, the inclined planes of the engagement tongues are out of contact with the robot body, and under the elastic force exerted by the elastic elements, the engagement tongues pop up to fix the battery pack.

The second purpose of the present application is realized by adopting the following technical solution:
The battery pack further includes a sealing ring and a battery pack housing, and the battery pack housing or the battery pack panel is provided with a sealing groove for mounting the sealing ring; when the sealing ring is mounted in the sealing groove, an edge of the sealing ring protrudes out of the sealing groove. Since the sealing ring protrudes out of the sealing groove, when the battery pack is placed inside the robot body, the sealing ring fits with the robot body and then plays a sealing role; when the battery pack is taken out, the sealing ring is out of contact with the robot body and the battery pack is convenient to be taken out.

Further, the battery pack further includes a battery set and a hub board provided inside the battery pack, two ends of the battery set are respectively provided with a conductive bar, the conductive bar includes a first conductive part and a second conductive part, the first conductive part is electrically connected with the end of the battery set, and the second conductive part is electrically connected with the hub board; the second conductive part is provided on the hub board in a row, and the hub board is provided on the side of the battery set. Since the position of the hub board is disposed on the side of the battery set, the distance from the two ends of the battery set to the hub board is minimized, so that the first conductive parts of the conductive bars connecting the electrodes of the battery set can be directly and electrically connected to the hub board. The connection between the hub board and the battery set can be realized with the most direct wiring and the shortest wiring distance. There are no redundant leads, and the structure in the battery pack is more compact and reliable.

Further, the battery pack further includes a power supply management unit and an interface board, and the hub board and the interface board are respectively and electrically connected with the power supply management unit. The power supply management unit includes a power supply management board, which is mainly used to control and manage the battery set. The interface board is mainly used for charging and discharging of the battery pack. The interface board may be disposed on the other sides of the battery pack according to actual needs.

In this solution, the battery pack is provided with the conductive bar and the hub board, the battery set is integrated into the hub board through the conductive bar and then connected to the power supply management unit, and the design of the hub board makes the internal structure of the battery pack compact and highly integrated; moreover, the leads of battery cells will not interfere with each other, so that the battery pack is not easy to fail, and the mounting and maintenance of the battery pack are also facilitated.

Further, the battery pack further includes a battery pack bottom board fixedly connected with the battery pack housing, the power supply management unit and the hub board are sequentially provided between the battery pack panel and the side of the battery set, and the interface board is provided between the battery pack bottom board and the side of the battery set. Since the power supply management unit is disposed on one side of the battery pack panel, the keys and display lamps on the power supply management unit can be directly connected with the battery pack panel. The power supply management board and the hub board are superimposed in parallel, the structure is compact, less space is occupied, and the electrical connection therebetween is more simple, convenient and reliable.

The battery pack further includes a power cable, and the interface board is electrically connected with the power supply management unit through the power cable Further, opposite sides of the battery pack housing are provided with heat dissipation and ventilation holes. Disposing heat dissipation and ventilation holes can make the heat generated during the use of the battery set be dissipated in time, avoid the accumulation of heat in the battery pack that may result in excessive high local temperature and failure of the battery pack, and is conducive to high-current charging and discharging.

The third purpose of the present application is realized by adopting the following technical solution:
A legged robot, including the battery pack described above.

Compared with the prior art, the present application has the following beneficial effects:
1. In the present application, by disposing the slide fastener structure, when the battery pack is placed inside the robot body, the engagement tongues extend to the outer side of the battery pack and remain an extended state under the action of the elastic force provided by the elastic elements, and the engagement tongues can be clamped with the inside of the robot body, so as to reliably fix the battery pack inside the robot body; when it is necessary to take out the battery pack for charging or maintenance, a force is exerted to the slide fasteners to overcome the elastic force of the elastic elements, the slide fasteners move, and then the engagement tongues are retracted into the battery pack panel, so that the battery pack can be easily taken out from the inside of the robot body. In this solution, the battery pack is reliably fixed in the robot body and is convenient to be taken out.

2. In the present application, by disposing the sealing structure, since the sealing ring protrudes out of the sealing groove, when the battery pack is placed inside the robot body, the sealing ring fits with the robot body to play a sealing role; when the battery pack is taken out, the sealing ring is out of contact with the robot body and the battery pack is convenient to be taken out.

3. The legged robot provided by the present application is provided with the battery pack, and the battery pack is provided with the slide fastener structure. When the battery pack is placed inside the robot body, the engagement tongues extend to the outer side of the battery pack and remain an extended state under the action of the elastic force provided by the elastic elements, and the engagement tongues can be clamped with the inside of the robot body, so as to reliably fix the battery pack inside the robot body; when it is necessary to take out the battery pack for charging or maintenance, a force is exerted to the slide fasteners to overcome the elastic force of the elastic elements, the slide fasteners move, and then the engagement tongues are retracted into the battery pack panel, so that the battery pack can be easily taken out from the inside of the robot body. In this solution, the battery pack is reliably fixed in the robot body and is convenient to be taken out.

The present application will be further described below in detail in combination with the embodiments and with reference to the drawings.

Figure 1:
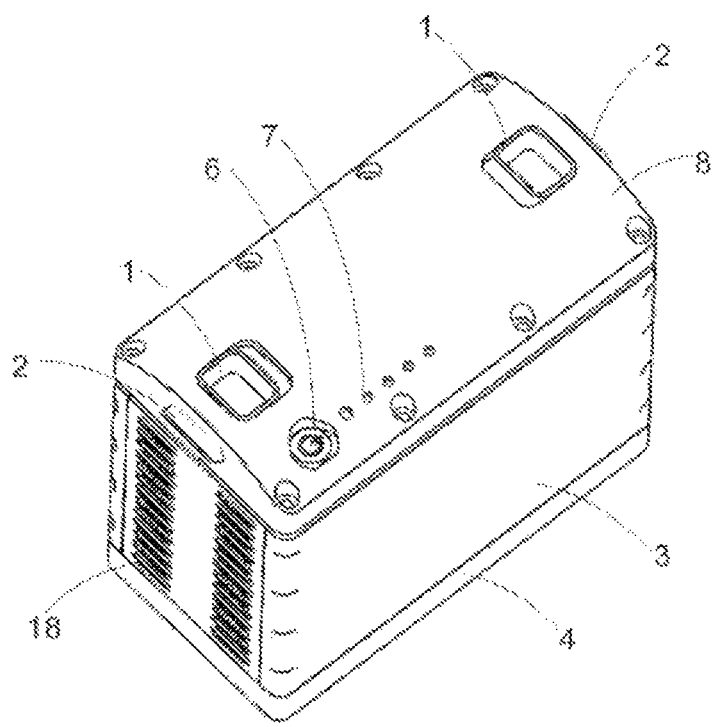
FIG. 1 illustrates a schematic view of an overall structure according to the present application.

In the drawings, 1—slide fastener; 2—engagement tongue; 3—battery pack housing; 4—battery pack bottom board; 5—battery set; 6—power supply button; 7—electric quantity indicating lamp; 8—battery pack panel; 9—power cable; 10—hub board; 11—sealing groove; 12—elastic element; 13—conductive bar; 14—first conductive part; 15—second conductive part; 18—heat dissipation and ventilation hole.

DESCRIPTION OF THE EMBODIMENTS

The present application will be further described below in combination with the specific embodiments and with reference to the drawings. It should be noted that the embodiments or technical features described below may be freely combined to form new embodiments without conflict.

It should be noted that when two components are called "fixedly connected", the two components may be directly connected or there may be an intermediate component. On the contrary, when a component is called "directly on" another component, there is no intermediate component. Unless otherwise defined, all technical and scientific terms used herein have the same meanings as those generally understood by those skilled in the technical field of the present application. The terms used herein are only for the purpose of describing specific embodiments and are not intended to limit the present application.

Figure 2:
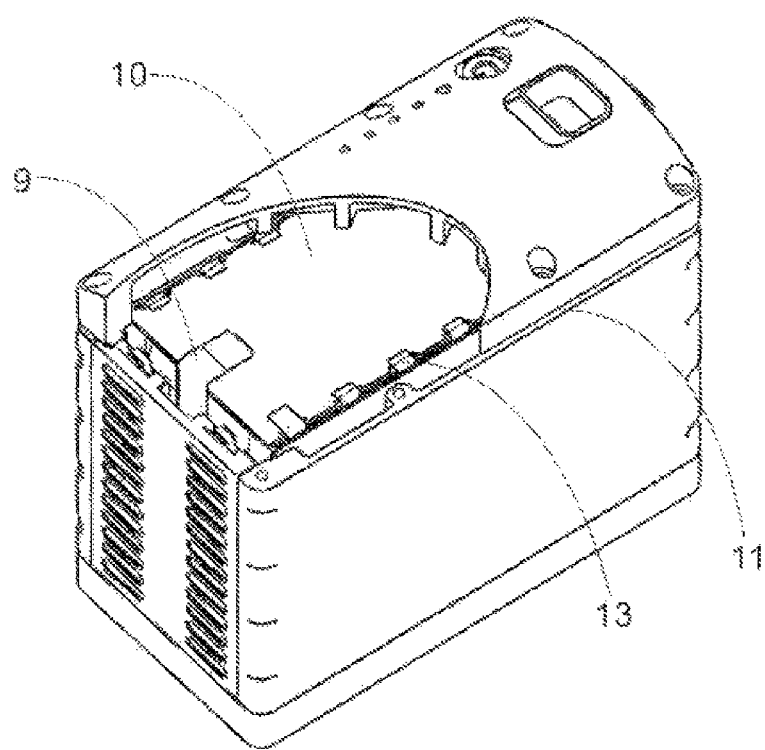
FIG. 2 illustrates a semi-sectional view according to the present application.
Figure 3:
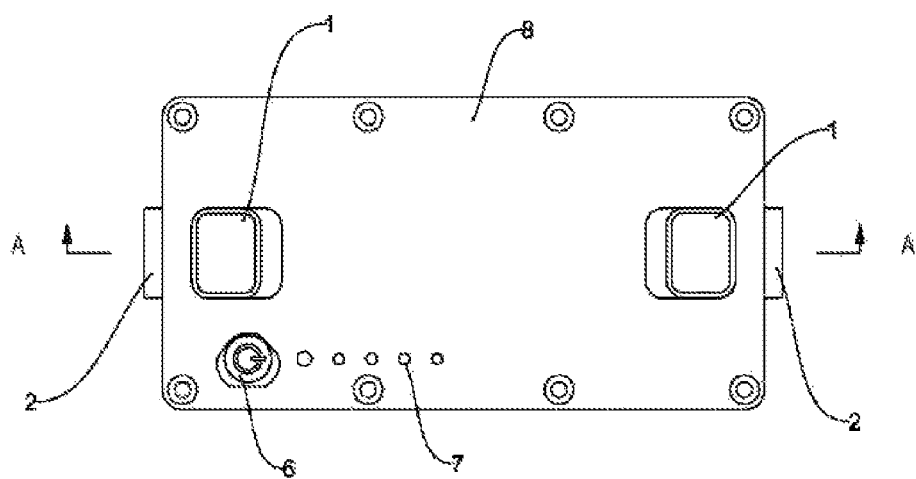
FIG. 3 illustrates a top view of a battery pack panel according to the present application.
Figure 4:
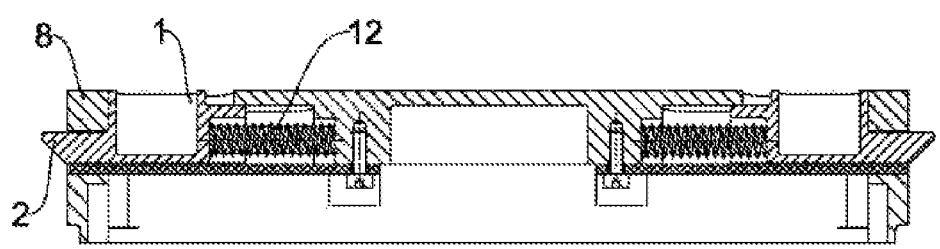
FIG. 4 illustrates a sectional view of a section A-A according to the present application.
Figure 5:
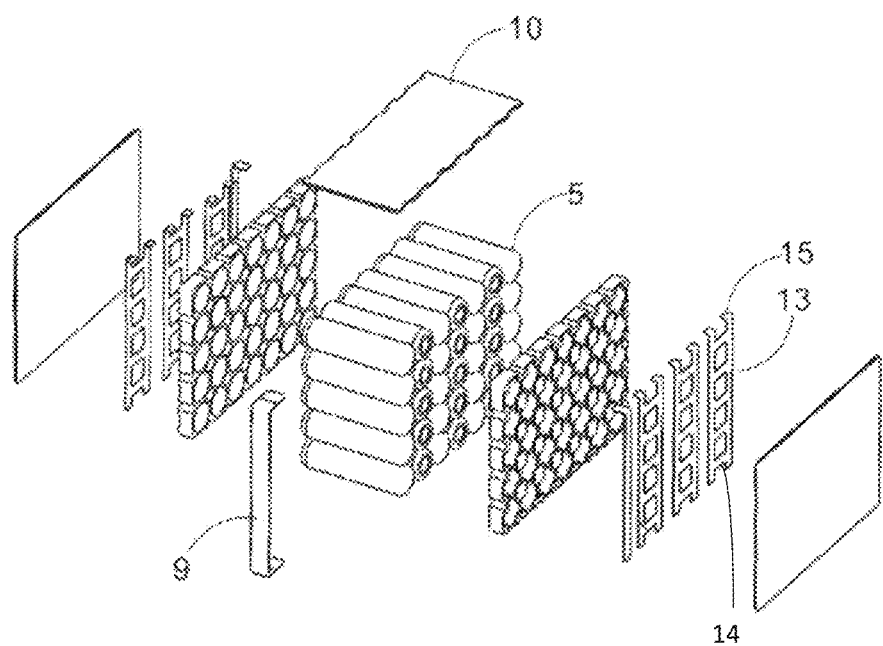
FIG. 5 illustrates an exploded view of an internal battery set according to the present application.

Referring to FIG. 1 to FIG. 5, a battery pack includes a battery pack panel 8 and slide fasteners 1, a power supply button 6 and electric quantity indicating lamps 7 are provided on the battery pack panel 8, the slide fasteners 1 each include an engagement tongue 2, cavities are respectively provided on two sides of the battery back panel 8, the slide fasteners 1 are able to slide inside the cavities, and elastic elements 12 are provided between the slide fasteners 1 and the battery pack panel 8; when the elastic elements 12 exert an elastic force on the slide fasteners 1 and cause the slide fasteners 1 to abut against one side of the cavities, the engagement tongues 2 extend out to an outer side of the battery pack panel 8; when an external force overcomes the elastic force provided by the elastic elements 12 and the slide fasteners 1 are caused to get close to the other side of the cavities, the engagement tongues 2 are retracted into the battery pack panel 8.

In the above solution, through the cooperation of the slide fasteners 1 and the engagement tongue 2 structure, when the battery pack is placed inside the robot body, the engagement tongues 2 extend to the outer side of the battery pack and remain an extended state under the action of the elastic force provided by the elastic elements 12, and the engagement tongues 2 can be clamped with the inside of the robot body, so as to reliably fix the battery pack inside the robot body; when it is necessary to take out the battery pack for charging or maintenance, a force is exerted to the slide fasteners 1 to overcome the elastic force of the elastic elements 12, the slide fasteners move, and then the engagement tongues 1 are retracted into the battery pack panel 8, so that the battery pack can be easily taken out from the inside of the robot body. In this solution, the battery pack is reliably fixed in the robot body and is convenient to be taken out.

An embodiment of adding a shape of engagement tongues 2 in the present application is as follow:

The engagement tongues 2 are wedge-shaped, and inclined planes of the wedge-shaped engagement tongues 2 face to a bottom of the battery pack. Since the engagement tongues 2 are designed to be wedge-shaped, when the battery pack is placed inside the robot body and the engagement tongues 2 are in contact with the robot body, the robot body can exert a force on the inclined planes of the engagement tongues 2, so as to enable the engagement tongues 2 to be retracted into the battery pack panel 8 to facilitate the placement of the battery pack; when the battery pack is placed inside the robot body, the inclined planes of the engagement tongues are out of contact with the robot body, and under the elastic force exerted by the elastic elements 12, the engagement tongues 2 pop up to fix the battery pack. In addition, since the inclined planes of the engagement tongues 2 face to the bottom of the battery pack, the inclined planes can be ensured to always face to the direction in which the battery pack is placed inside the robot body. When the battery pack is placed in the robot body, the robot body can exert a force to the engagement tongues 2 to enable the engagement tongues 2 to be retracted into the battery pack panel 8.

An embodiment of adding a sealing groove 11 in the present application is as follow:

The battery pack further includes a sealing ring and a battery pack housing 3, and the battery pack housing or the battery pack panel 8 is provided with a sealing groove 11 for mounting the sealing ring; when the sealing ring is mounted in the sealing groove 11, an edge of the sealing ring protrudes out of the sealing groove 11. Since the sealing ring protrudes out of the sealing groove 11, when the battery pack is placed inside the robot body, the sealing ring fits with the robot body and then plays a sealing role to prevent external liquid from entering the robot body; when the battery pack is taken out, the sealing ring is out of contact with the robot body and the battery pack is convenient to be taken out.

An embodiment of additionally disposing a hub board 10 and a conductive bar 13 in the present application is as follow:

The battery pack further includes a battery set 5 and a hub board 10 provided inside the battery pack, two ends of the battery set 5 are respectively provided with a conductive bar 13, the conductive bar 13 includes a first conductive part 14 and a second conductive part 15, the first conductive part 14 is electrically connected with the end of the battery set 5, and the second conductive part 15 is electrically connected with the hub board 10; the second conductive part 15 is provided on the hub board 10 in a row, and the hub board 10 is provided on the side of the battery set 5. Since the position of the hub board 10 is disposed on the side of the battery set 5, the distance from the two ends of the battery set 5 to the hub board 10 is minimized, so that the first conductive parts 14 of the conductive bars 13 connecting the electrodes of the battery set 5 can be directly and electrically connected to the hub board 10. The connection between the hub board 10 and the battery set 5 can be realized with the most direct wiring and the shortest wiring distance. There are no redundant leads, and the structure in the battery pack is more compact and reliable.

An embodiment of additionally disposing a power supply management unit and an interface board in the present application is as follow:

The battery pack further includes a power supply management unit and an interface board, and the hub board 10 and the interface board are respectively and electrically connected with the power supply management unit. The power supply management unit includes a power supply management board, which is mainly used to control and manage the battery set 5. The interface board is mainly used for charging and discharging of the battery pack. The interface board may be disposed on the other sides of the battery pack according to actual needs. In this solution, the battery pack is provided with the conductive bar 13 and the hub board 10, the battery set 5 is integrated into the hub board 10 through the conductive bar 13 and then connected to the power supply management unit, and the design of the hub board 10 makes the internal structure of the battery pack compact and highly integrated; moreover, the leads of battery cells will not interfere with each other, so that the battery pack is not easy to fail, and the mounting and maintenance of the battery pack are also facilitated.

An embodiment of additionally disposing a power cable 9 and an interface board 18 in the present application is as follow:

The battery pack further includes a battery pack bottom board 4 fixedly connected with the battery pack housing 4, the power supply management unit and the hub board 10 are sequentially provided between the battery pack panel 8 and the side of the battery set 5, and the interface board is provided between the battery pack bottom board 4 and the side of the battery set 5. Since the power supply management unit is disposed on one side of the battery pack panel 8, the keys and display lamps on the power supply management unit can be directly connected with the battery pack panel 8. The power supply management board and the hub board 10 are superimposed in parallel, the structure is compact, less space is occupied, and the electrical connection therebetween is more simple, convenient and reliable. The battery pack further includes a power cable 9, and the interface board is electrically connected with the power supply management unit through the power cable 9. Opposite sides of the battery pack housing 3 are provided with heat dissipation and ventilation holes 18. Disposing heat dissipation and ventilation holes 18 can make the heat generated during the use of the battery set be dissipated in time, avoid the accumulation of heat in the battery pack that may result in excessive high local temperature and failure of the battery pack, and is conducive to high-current charging and discharging.

The present application further provides a legged robot, which includes the battery pack described above.

The above embodiments are only exemplary embodiments of the present application and should not limit the scope of protection of the present application. Any non-substantive changes and replacements made by those skilled in the art on the basis of the present application belong to the scope of protection of the present application.

The invention claimed is:

1. A battery pack, wherein the battery pack comprises a battery pack panel and slide fasteners, the battery pack panel comprises a first side and a second side deposited opposite to the first side, each of the first side and the second side include a cavity to accommodate one of the slide fasteners, each of the slide fasteners are coupled with an engagement tongue, the slide fasteners are able to slide inside the cavities of the first side and the second side and to respectively move the engagement tongue deposited at the first side and the engagement tongue deposited at the second side in opposite directions parallel to the battery pack panel, and elastic elements are provided between the slide fasteners and the battery pack panel;

when the elastic elements exert an elastic force on the slide fasteners and cause the slide fasteners to abut against one sidewall of the cavities, the engagement tongues at the first side and the second side respectively extend out along the opposite directions to an outer sidewall of the battery pack panel; when an external force overcomes the elastic force provided by the elastic elements and the slide fasteners are caused to get close to the other sidewall of the cavities, the engagement tongues at the first side and the second side are respectively retracted along the opposite directions into the battery pack panel.

2. The battery pack according to claim 1, wherein the engagement tongues are wedge-shaped, and inclined planes of the wedge-shaped engagement tongues face to a bottom of the battery pack.

3. The battery pack according to claim 1, wherein the battery pack further comprises a sealing ring and a battery pack housing, and the battery pack housing or the battery pack panel is provided with a sealing groove for mounting the sealing ring; when the sealing ring is mounted in the sealing groove, an edge of the sealing ring protrudes out of the sealing groove.

4. The battery pack according to claim 3, wherein the battery pack further comprises a battery set and a hub board provided inside the battery pack, two ends of the battery set are respectively provided with a conductive bar, the conductive bar comprises a first conductive part and a second conductive part, the first conductive part is electrically connected with the end of the battery set, and the second conductive part is electrically connected with the hub board; the second conductive part is coupled with the hub board in a row, and the hub board is coupled with a side of the battery set.

5. The battery pack according to claim 3, wherein the first side and the second side of the battery pack housing are provided with heat dissipation and ventilation holes.

6. A legged robot, wherein the legged robot comprises the battery pack according to claim 1.

* * * * *